US007210064B2

(12) United States Patent
Mayer

(10) Patent No.: US 7,210,064 B2
(45) Date of Patent: Apr. 24, 2007

(54) PROGRAM CONTROLLED UNIT AND METHOD FOR DEBUGGING PROGRAMS EXECUTED BY A PROGRAM CONTROLLED UNIT

(75) Inventor: Albrecht Mayer, Delsenhofen (DE)

(73) Assignee: Infineon Technologies AG, Munich (DE)

( * ) Notice: Subject to any disclaimer, the term of this patent is extended or adjusted under 35 U.S.C. 154(b) by 500 days.

(21) Appl. No.: 10/670,664

(22) Filed: Sep. 25, 2003

(65) Prior Publication Data

US 2004/0153760 A1   Aug. 5, 2004

(30) Foreign Application Priority Data

Sep. 25, 2002   (DE)   ............................... 102 44 922

(51) Int. Cl.
*G06F 11/00*   (2006.01)
(52) U.S. Cl. .............................. 714/30; 714/29; 714/31
(58) Field of Classification Search ............. 714/29–31
See application file for complete search history.

(56) References Cited

U.S. PATENT DOCUMENTS 5,935,266 A * 8/1999 Thurnhofer et al. ........ 714/726
6,209,045 B1 * 3/2001 Hasegawa et al. ............ 710/15
6,339,753 B1 * 1/2002 Nagatome ..................... 703/28
6,769,065 B2 * 7/2004 Mayer ............................ 726/2
6,922,794 B2 * 7/2005 Tagawa et al. ............... 714/28
6,944,794 B2 * 9/2005 Okabayashi et al. .......... 714/28
2003/0074180 A1 * 4/2003 Shibayama et al. ........... 703/28

FOREIGN PATENT DOCUMENTS

DE   198 35 610 A1   2/2000
EP     0 720 092 A1   7/1996

* cited by examiner

*Primary Examiner*—Robert Beausoliel
*Assistant Examiner*—Emerson Puente
(74) *Attorney, Agent, or Firm*—Laurence A. Greenberg; Werner H. Stemer; Ralph E. Locher

(57) ABSTRACT

The described program controlled unit has first supply voltage connections for applying a first supply voltage to the program controlled unit and second supply voltage connections for applying a second supply voltage to the program controlled unit. The full OCDS module or a part of the OCDS module is supplied with power by the second supply voltage. The remaining components of the program controlled unit are supplied with power by the first supply voltage. This means that the entire OCDS module or part of the OCDS module can actually be supplied with power, before the time at which the remaining parts of the program controlled unit are supplied with power. A debugger supplies the OCDS module with control information that prescribes a particular state of the OCDS module.

24 Claims, 1 Drawing Sheet

PROGRAM CONTROLLED UNIT AND METHOD FOR DEBUGGING PROGRAMS EXECUTED BY A PROGRAM CONTROLLED UNIT

BACKGROUND OF THE INVENTION

Field of the Invention

The present invention relates to a program controlled unit having an OCDS (on-chip debug support) module, and to a method for debugging programs that are executed by a program controlled unit that contains an OCDS module and that is connected to an external debugger. The debugger controls the OCDS module. The debugger actuates the OCDS module to control the actions that the OCDS module executes.

The program controlled units in question are, by way of example, microprocessors, microcontrollers and the like. They have been known for many years in a very wide variety of embodiments and require no more detailed explanation.

The OCDS modules are the "on-chip debug support modules" that are now being integrated into almost all recent program controlled units. Such devices can be used by external debuggers during the "normal" operation of the program controlled units to access and influence them in a wide variety of ways.

The design of a configuration in which a microcontroller containing an OCDS module is connected to an external debugger is illustrated in FIG. 3.

In the configuration shown in FIG. 3, the microcontroller is denoted by the reference symbol PGE and the external debugger is denoted by the reference symbol D.

The microcontroller PGE contains a core C, an OCDS module OCDS connected to the core C and possibly to further microcontroller components, memory devices S1 to Sn, peripheral units P1 to Pm and internal buses BUS 1 and BUS 2. The first bus BUS1 connects the core C and the memory devices S1 to Sn to one another and the second bus BUS2 connects the core C and the peripheral units P1 to Pm to one another.

In addition, the microcontroller PGE has a multiplicity of input and/or output connections IO used to supply the program controlled unit with power and used to transfer data being output by the micro-controller components to external systems components and data being supplied to the micro-controller by external system components.

The input and/or output connections IO are connected to respectively associated microcontroller components by internal lines or buses. Of these lines, FIG. 3 shows only the lines connecting the OCDS module OCDS to the input and/or output connections that are connected to the external debugger D.

In the example under consideration, the microcontroller PGE, to be more precise its OCDS module OCDS, is connected to the debugger D via four input and/or output connections IO and four lines DL1 to DL4.

By way of example, the interface via which the microcontroller PGE is connected to the debugger D is a JTAG (Joint Test Action Group) interface, but it can also be any other interface, for example a USB (universal serial bus) interface, an Ethernet interface, a "normal" serial or parallel interface etc. Accordingly, the number of input and/or output connections IO and the number of external connecting lines to the debugger D can also vary.

The debugger D is formed by a personal computer, for example.

The debugger uses the lines DL1 to DL4 and the input and/or output connections IO connected thereto to send data and/or control commands, subsequently referred to as control information, to the OCDS module, and receives requested data back for the OCDS module.

The control information transmitted to the OCDS module puts the OCDS module into the state which it needs to be in for it to execute the actions expected of it; the actions to be executed by the OCDS module are stipulated by virtue of the user of the system making appropriate inputs into the debugger.

By way of example, but by no means exclusively, the debugger can prompt the OCDS module to stop the microcontroller when a condition prescribed by the user appears and/or to carry out read and/or write access operations, prescribed by the user, to the internal and external registers, memories and/or other components of the microcontroller and/or of the system containing it.

As a result, errors occurring during operation of the program controlled unit can be located and eliminated.

Debugging primarily allows errors in programs executed by the program controlled unit to be located and eliminated, to be precise, the programs executed by the program controlled unit are debugged, however, the text below always refers to debugging the program controlled unit, for the sake of simplicity.

Both OCDS modules and external debuggers, which are devices for searching for existing software and/or hardware errors in program controlled units, have been known for a long time and have been used in a large number of embodiments, which means that there is no need for a more detailed description.

The OCDS modules turn the external debuggers (which are of relatively simple design) into very powerful tools that are able to efficiently and comprehensively monitor and check even program controlled units that are of very complicated design and/or that are characterized by very rapid operation.

However, configurations of the type shown in FIG. 3 are not able to locate and eliminate all errors that can occur in program controlled units or in systems containing program controlled units. In particular, it is not possible to locate and eliminate errors that occur immediately after the program controlled unit is started up, because it takes some time until the OCDS module has been reset and can be actuated by the debugger as desired.

SUMMARY OF THE INVENTION

It is accordingly an object of the invention to provide a program controlled unit having an OCDS module and a method for debugging programs that are executed by the program controlled, which overcome the above-mentioned disadvantages of the prior art apparatus and methods of this general type.

In particular, it is an object of the invention to find a way of using a configuration of the type shown in FIG. 3 so that it is also possible to locate and eliminate errors in program controlled units or in systems containing program controlled units which occur immediately after the program controlled unit is started up.

With the foregoing and other objects in view there is provided, in accordance with the invention, a program controlled unit that has an OCDS module consisting of a plurality of components; a plurality of first supply voltage connections for applying a first supply voltage; a plurality of second supply voltage connections for applying a second supply voltage; and a plurality of components (the remaining components of the program controlled unit) configured for being supplied with power by the first supply voltage. At least some of the plurality of components of the OCDS module are configured for being supplied with power by the second supply voltage.

In accordance with an added feature of the invention, the plurality of components that are configured for being supplied with power by the first supply voltage cannot also be supplied with power by the second supply voltage.

In accordance with an additional feature of the invention, the components of the OCDS module that are configured for being supplied with power by the second supply voltage cannot also be supplied with power by the first supply voltage.

In accordance with another feature of the invention, the OCDS module is configured to be connected to an external debugger and the OCDS module is configured for interacting with the debugger to debug programs executed by the program controlled unit.

In accordance with a further feature of the invention, the OCDS module is configured to be controlled by the debugger; and the OCDS module is configured to execute particular actions actuated by the debugger.

In accordance with a further added feature of the invention, the components of the OCDS module that are configured for being supplied with power by the second supply voltage include components that have a state dependent on an actuation by the debugger.

In accordance with a further additional feature of the invention, the components of the OCDS module that are configured for being supplied with power by the second supply voltage include only components that have a state dependent on an actuation by the debugger.

In accordance with another added feature of the invention, a control device is configured for putting the OCDS module into a state prescribed by the debugger.

In accordance with another additional feature of the invention, the control device is formed by a state machine or a CPU configured for transferring data stored in a control information memory to assigned locations within the OCDS module.

In accordance with yet an added feature of the invention, the control device is formed by a CPU; and the CPU is configured for using the control information memory as a program storage device and for executing a program represented by content stored in the control information memory.

In accordance with yet an additional feature of the invention, the control device is configured for putting the OCDS module into a state prescribed by the debugger taking into account control information stored in a control information memory.

In accordance with yet another feature of the invention, the control information memory can be written to by the debugger.

In accordance with yet a further feature of the invention, the control information memory is configured for being powered by the second supply voltage.

In accordance with an added feature of the invention, the control information memory is one of the plurality of components of the OCDS module; and only the control information memory is configured for being supplied with power by the second supply voltage.

In accordance with an additional feature of the invention, the control information memory is formed by a volatile memory.

In accordance with another feature of the invention, the control device configured for checking, following an application of the first supply voltage, whether a control information memory contains data required to put the OCDS module into another state.

In accordance with a further feature of the invention, the control device is configured for performing the checking by determining whether a particular value is stored at a particular location within the control information memory.

In accordance with a further added feature of the invention, the control device is configured for putting the OCDS module into a state prescribed by a content of a control information memory, if the checking reveals that the OCDS module needs to be put into another state.

In accordance with yet a further added feature of the invention, all of the plurality of components of the OCDS module are configured for being supplied with power by the second supply voltage With the foregoing and other objects in view there is provided, in accordance with the invention, a method for debugging programs. The method includes steps of: providing a program controlled unit including an OCDS module for executing particular actions actuated by an external debugger connected to the program controlled unit; supplying at least a portion of the OCDS module with power before supplying other components of the program controlled unit with power; and from the debugger, supplying the OCDS module with control information prescribing a particular state of the OCDS module.

In accordance with an added mode of the invention, the OCDS module is immediately put into the state prescribed by the control information.

In accordance with an added mode of the invention, the method includes: writing the control information to a control information memory in the OCDS module; and after the other components of the program controlled unit have been supplied with power, putting the OCDS module into the state prescribed by the control information.

In accordance with an additional mode of the invention, the method includes: writing the control information to a control information memory in the OCDS module; and immediately after the other components of the program controlled unit have been supplied with power, automatically putting the OCDS module into the state prescribed by the control information.

In accordance with another mode of the invention, the method includes: before putting the OCDS module into another state, checking whether the control information memory is storing valid control information.

In accordance with a further mode of the invention, the checking step is performed by determining whether a particular value is stored at a particular location within the control information memory.

In accordance with a further added mode of the invention, the method includes: providing a control information memory as the portion of the OCDS module that is supplied with power before supplying the other components of the program controlled unit with power; and immediately putting the OCDS module into the state prescribed by the control information.

As a result, it is possible for the OCDS module to be in required the state in order to be able to debug the program controlled unit in interaction with the external debugger when the program controlled unit is actually started up or at an extremely short time thereafter. Consequently, it is possible to start debugging the program controlled unit when it is actually started up.

Other features which are considered as characteristic for the invention are set forth in the appended claims.

Although the invention is illustrated and described herein as embodied in a program controlled unit and method for debugging programs executed by a program controlled unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
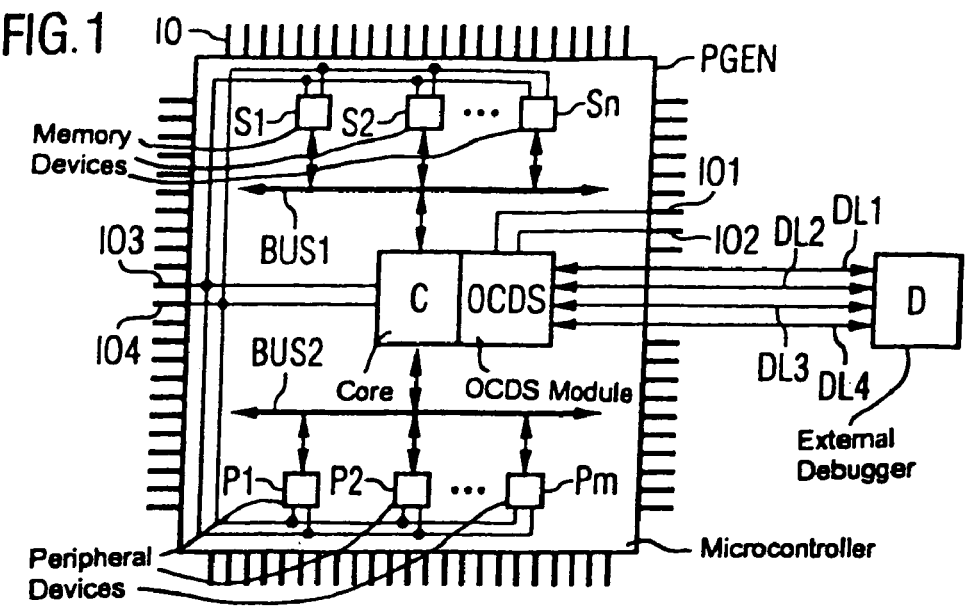
FIG. 1 is a block diagram of a configuration for debugging a program controlled unit.

The configuration described below has the same basic design as the prior art configuration described initially with reference to FIG. 3. Unless other mention is expressly made below, the statements made in relation to the configuration shown in FIG. 3 also apply to the configurations described below.

In the example under consideration, the program controlled unit which is to be debugged is a micro-controller. It could equally be any other program controlled unit, however, such as a microprocessor or a signal processor.

Referring now to the figures of the drawing in detail and first, particularly, to FIG. 1 thereof, there is shown the basic design of the configuration described below. The components of the configuration shown in FIG. 1, which are denoted by the same reference symbols used in FIG. 3, correspond to the components of the configuration shown in FIG. 3.

Figure 3:
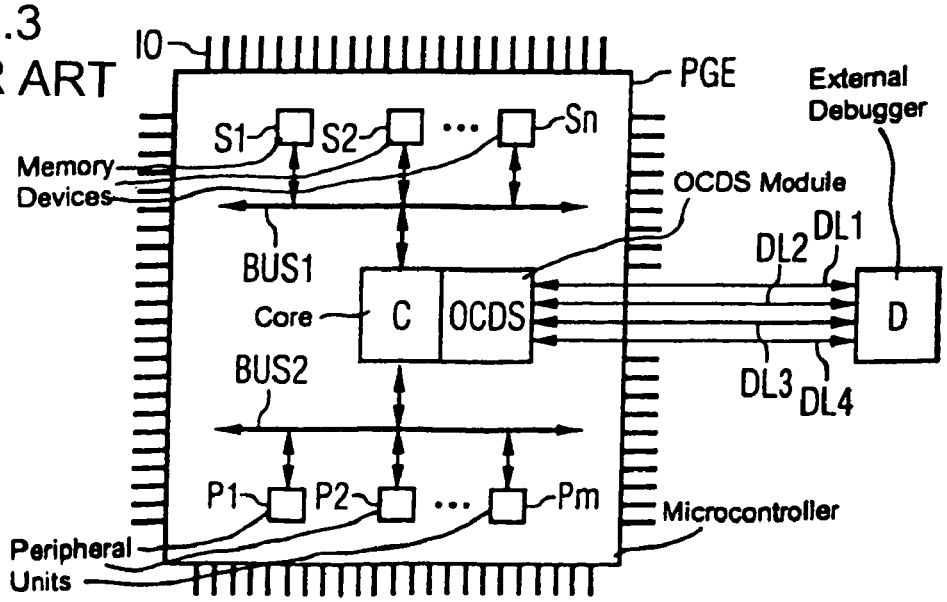
FIG. 3 is a block diagram of a prior art configuration for debugging a program controlled unit.

Accordingly, the configuration shown in FIG. 1 differs from the conventional configuration shown in FIG. 3 "only" by the microcontroller.

The microcontroller PGEN in the configuration shown in FIG. 1 has the particular feature that at least parts of the OCDS module are supplied with power by a different power source than the rest of the micro-controller.

To this end, the microcontroller PGEN has first supply voltage connections IO3 and IO4 for applying a first supply voltage to the microcontroller PGEN and has second supply voltage connections IO1 and IO2 for applying a second supply voltage to the microcontroller PGEN. The second supply voltage supplies power to the OCDS module or to particular parts thereof, and the first supply voltage supplies power to the remaining components of the microcontroller PGEN.

The fact that the OCDS module and the remaining components of the microcontroller PGEN are supplied with power using different supply voltage connections means that it is optionally possible for:

both the OCDS module and the remaining components of the microcontroller to be supplied with power (the microcontroller PGEN is operated in a first mode M1); or just the OCDS module to be supplied with power (the microcontroller is operated in a second mode M2), or just the remaining components of the microcontroller PGEN to be supplied with power (the microcontroller is operated in a third mode M3), or neither the OCDS module nor the remaining components of the microcontroller PGEN to be supplied with power (the microcontroller PGEN is operated in a fourth mode M4).

During normal use of the microcontroller PGEN, i.e. when no debugger D is connected, the microcontroller PGEN is operated in the third mode M3 by not applying the second supply voltage to the microcontroller (when the first supply voltage is applied), or is operated in the fourth mode M4 (when the first supply voltage is not applied either).

If the microcontroller PGEN is intended to be debugged, it is operated in the first mode M1 by applying the second supply voltage to the microcontroller PGEN (when the first supply voltage is also applied), or is operated in the second mode M2 (when the first supply voltage is not applied).

Preferably, the part of the microcontroller PGEN which is supplied with power by the first supply voltage cannot also be supplied with power by the second supply voltage, and the part of the microcontroller PGEN which is supplied with power by the second supply voltage cannot also be supplied with power by the first supply voltage.

The possibility of optionally operating the microcontroller PGEN in one of the four modes explained above is found to be advantageous in several respects.

One of these advantages is that, during normal operation of the microcontroller PGEN, i.e. when no debugger is connected, the OCDS module can be operated in a mode (mode M3) in which the OCDS module is not supplied with power and in which the microcontroller PGEN therefore has minimum power consumption.

The second advantage, which is at least as important, is that the microcontroller PGEN can be operated such that, when the first supply voltage is applied to the microcontroller PGEN, the OCDS module can already be in a state prescribed by the user of the system, and therefore debugging can be started immediately after the micro-controller PGEN has been started up (immediately after the first supply voltage has been applied). Putting the OCDS module into the state which it needs to have in order for it to be possible to start debugging the microcontroller PGEN essentially at the same time as the first supply voltage is applied is referred to as an immediate-start setting below. The situation in which the OCDS module is actually in the state prescribed by the user when the first supply voltage is applied can be achieved by virtue of the immediate-start setting actually taking place before the first supply voltage is applied. How long before the first supply voltage is applied the immediate-start setting takes place is insignificant. The only important aspect is that the OCDS module is supplied with power continuously by the second supply voltage between the immediate-start setting and the application of the first supply voltage (and naturally thereafter as well). It is also insignificant whether immediate-start setting takes place in a phase in which the microcontroller is operated in mode M1 or whether it takes place in a phase in which the microcontroller PGEN is operated in mode M2.

For the sake of completeness, it should be noted that those parts of the microcontroller PGEN which are supplied with power by the first supply voltage and those parts of the microcontroller PGEN which are supplied with power by the second supply voltage can be reset independently of one another. To be more precise, resetting those parts of the microcontroller PGEN which are supplied with power by the first supply voltage must not also prompt resetting of those parts of the microcontroller PGEN which are supplied with power by the second supply voltage, and resetting those parts of the microcontroller PGEN which are supplied with power by the second supply voltage must not also prompt resetting of those parts of the microcontroller PGEN which are supplied with power by the first supply voltage.

Preferably, the full OCDS module is supplied with power by the second supply voltage. If the individual components of the OCDS module are broadly scattered over the circuit that forms the micro-controller, it can prove to be advantageous for just particular parts of the OCDS module to be supplied with power by the second supply voltage.

It is even possible for just a memory in the OCDS module, subsequently referred to as control information memory, to be supplied with power by the second supply voltage.

Figure 2:
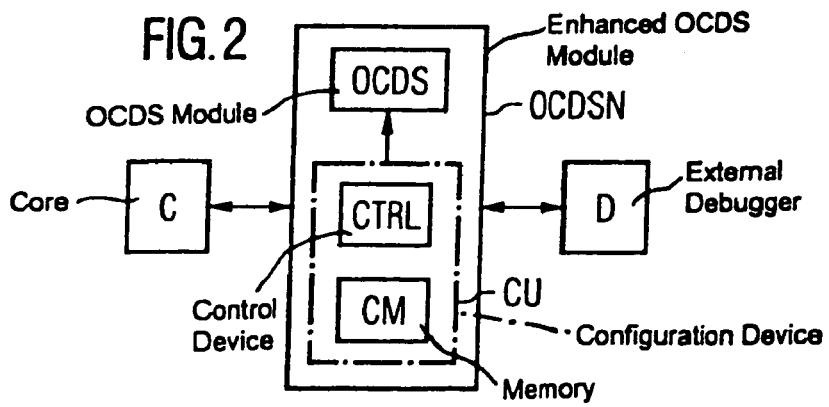
FIG. 2 is a block diagram of an OCDS module that can be used to simply implement the program controlled unit that will be debugged.

An enhanced OCDS module for this is the case is shown in FIG. 2 and is denoted by reference symbol OCDSN. The enhanced OCDS module OCDSN contains a conventional OCDS module OCDS, and a configuration device CU for automatically and independently configuring the OCDS module OCDS. In the example under consideration, the configuration device CU contains a control device CTRL and a control information memory CM.

In the example under consideration, the control information memory CM is formed by a RAM (Random Access Memory) or is part of a RAM. Alternatively, it could be formed by any other memory.

The control information memory CM used could also be a memory or part of a memory in the OCDS module OCDS. Particularly when steps are taken to ensure that the control information memory can or may be written to only in phases in which the micro-controller is operated in mode M2, the control information memory used can be a memory which is used for other purposes during debugging, that is to say in mode M1 phases. The additional use of a memory which is present in the OCDS module anyway as a control information memory has the positive effect that no additional memory or memory area needs to be provided in order to implement the control information memory.

The control information memory CM stores control information which is used to put the OCDS module OCDS, during the transition from mode M2 operation of the microcontroller PGEN to mode M1 operation, into the state which it needs to have in order for it to be possible to start debugging the microcontroller PGEN essentially at the same time as it is started up.

The control information stored in the control information memory CM is written to the control information memory by the debugger.

Writing the control information to the control information memory CM does not immediately put the OCDS module into the state prescribed by the control information.

The OCDS module is not put into the state prescribed for the control information until a later time, to be more precise until the time at which the micro-controller changes from a state, in which no first supply voltage is supplied to it, to a state in which the first supply voltage is supplied to it.

As a result, it is possible that, of the OCDS module OCDSN, only the control information memory CM is supplied with power by the second supply voltage, and the remaining components of the OCDS module OCDSN are supplied with power by the first supply voltage.

In this case, although the OCDS module OCDSN is not yet actually in the state prescribed by the control information when the first supply voltage is applied to the microcontroller PGEN, it is possible to start putting the OCDS module into this state essentially at the same time as the first supply voltage is supplied, which means that it is possible to start debugging an extremely short time after the first supply voltage is applied.

Specifically, the OCDS module does not actually start to be put into the state prescribed by the control information when the first supply voltage is applied to the microcontroller PGEN, but rather only shortly afterwards—to be more precise only after the part of the microcontroller PGEN that is supplied with power by the first supply voltage has been reset (power on reset). For the sake of simplicity, the time at which the OCDS module starts to be put into the state prescribed by the control information is subsequently nevertheless referred to as the time at which the first supply voltage is applied to the microcontroller PGEN, however.

The OCDS module is put into the state prescribed by the control information in the following manner:

First, i.e. before the first supply voltage is actually applied, the debugger writes the control information to the control information memory. This control information is that which needs to be used to configure the OCDS module when the first supply voltage is applied. How much before the first supply voltage is applied, the control information is written, is insignificant. The only important aspect is that the control information memory CM is supplied with power continuously by the second supply voltage between the start of the control information being written to the control information memory and the end of the OCDS module being configured using these data (and naturally thereafter as well). It is also insignificant whether the control information is written to the control information memory in a phase in which the microcontroller PGEN is operated in mode M1 or whether this occurs in a phase in which the microcontroller PGEN is operated in mode M2.

As already explained above, writing the control information to the control information memory does not actually configure the OCDS module. The OCDS module is configured using these data only when the control device CTRL is next started up, that is to say when the first supply voltage is applied to the microcontroller PGEN the next time. To be more precise, the OCDS module is configured using these data when the microcontroller PGEN next changes from mode M2 operation to mode M1 operation.

The OCDS module is put into the state prescribed by the control information by the control device CTRL in the configuration device CU, which has already been mentioned above.

When the first supply voltage is applied to the microcontroller, those parts of the microcontroller PGEN which have not yet been supplied with power up until then, that is to say including the control device CTRL, inter alia, are also supplied with power.

Next, to be more precise, after the power on reset of those parts of the microcontroller PGEN which are supplied with power by the first supply voltage, the control device CTRL checks whether the control information memory stores control information which needs to be used to configure the OCDS module. This check is performed by virtue of the control device checking whether a particular value is stored at a particular location within the control information memory. If this is not the case, the control device does not configure the OCDS modules. Otherwise, the control device configures the OCDS module using the control information stored in the control information memory.

Since all the data which are required for configuring the OCDS module are stored in the control information memory, no data interchange between the microcontroller PGEN and the debugger is necessary during configuration, which means that configuration of the OCDS module can be started essentially at the same time as the first supply voltage is applied to the microcontroller PGEN and can be completed in a very short time.

The control device CTRL can be formed by a logic unit, to be more precise by a state machine, which, following the aforementioned check, transfers the data stored in the control information memory to assigned locations within the OCDS module.

Alternatively, the control device CTRL can be a CPU which executes a program which transfers the data stored in the control information memory to assigned locations within the OCDS module.

Alternatively, the control device CTRL can be a CPU, which uses the control information memory as a program storage device and executes the program represented by the control information.

If the OCDS module contains a CPU, this CPU can also be used as the control device CTRL.

The program controlled unit described above makes it possible, regardless of the details of the practical implementation, for debugging the program controlled unit actually to be started immediately after the program controlled unit is started up or a very short time afterwards.

I claim:

1. A program controlled unit, comprising:
    an OCDS module formed of a plurality of components;
    a plurality of first supply voltage connections for applying a first supply voltage;
    a plurality of second supply voltage connections for applying a second supply voltage;
    a plurality of additional components configured for being supplied with power by the first supply voltage;
    at least some of said plurality of components of said OCDS module configured for being supplied with power by the second supply voltage;
    a control information memory; and
    a control device for putting said OCDS module into a state prescribed for debugging taking into account data stored in said control information memory;
    said OCDS module configured to be connected to an external debugger and said OCDS module configured for interacting with the external debugger to debug programs executed by the program controlled unit.

2. The program controlled unit according to claim 1, wherein said plurality of additional components configured for being supplied with power by the first supply voltage cannot also be supplied with power by the second supply voltage.

3. The program controlled unit according to claim 1, wherein said at least some of said plurality of components of said OCDS module that are configured for being supplied with power by the second supply voltage cannot also be supplied with power by the first supply voltage.

4. The program controlled unit according to claim 1, wherein:
    said OCDS module is configured to be controlled by the debugger; and
    said OCDS module is configured to execute particular actions actuated by the debugger.

5. The program controlled unit according to claim 4, wherein said at least some of said plurality of components of said OCDS module that are configured for being supplied with power by the second supply voltage include components that have a state dependent on an actuation by the debugger.

6. The program controlled unit according to claim 4, wherein said at least some of said plurality of components of said OCDS module that are configured for being supplied with power by the second supply voltage include only components that have a state dependent on an actuation by the debugger.

7. The program controlled unit according to claim 4, wherein said control device configured for putting said OCDS module into a state prescribed by the debugger.

8. The program controlled unit according to claim 7, wherein said control device formed by a state machine or a CPU configured for transferring the data stored in said control information memory to assigned locations within said OCDS module.

9. The program controlled unit according to claim 7, wherein:
    said control device formed by a CPU; and
    said CPU configured for using said control information memory as a program storage device and for executing a program represented by the data stored in said control information memory.

10. The program controlled unit according to claim 7, wherein:
    said control device configured for putting said OCDS module into a state prescribed by the debugger taking into account control information stored in said control information memory.

11. The program controlled unit according to claim 10, wherein said control information memory can be written to by the debugger.

12. The program controlled unit according to claim 10, wherein said control information memory is configured for being powered by the second supply voltage.

13. The program controlled unit according to claim 12, wherein:
    said control information memory is one of said plurality of components of said OCDS module; and
    only said control information memory is configured for being supplied with power by the second supply voltage.

14. The program controlled unit according to claim 10, wherein said control information memory is formed by a volatile memory.

15. The program controlled unit according to claim 7, wherein:
    said control device configured for checking, following an application of the first supply voltage, whether said control information memory contains data required to put said OCDS module into another state.

16. The program controlled unit according to claim 15, wherein said control device is configured for performing the checking by determining whether a particular value is stored at a particular location within said control information memory.

17. The program controlled unit according to claim 15, wherein said control device is configured for putting said OCDS module into a state prescribed by a content of said control information memory, if the checking reveals that said OCDS module needs to be put into another state.

18. The program controlled unit according to claim 1, wherein all of said plurality of components of said OCDS module are configured for being supplied with power by the second supply voltage.

19. A method for debugging programs, which comprises:
providing a program controlled unit including an OCDS module for executing particular actions actuated by an external debugger connected to the program controlled unit;
supplying at least a portion of the OCDS module with power before supplying other components of the program controlled unit with power;
from the debugger, writing a control information memory of the OCDS module with control information prescribing a particular state of the OCDS module; and
after other components of the program controlled unit have been supplied with power, putting the OCDS module into the particular state prescribed by the control information.

20. The method according to claim 19, which further comprises immediately putting the OCDS module into the particular state prescribed by the control information.

21. The method according to claim 19, which further comprises:
immediately after the other components of the program controlled unit have been supplied with power, automatically putting the OCDS module into the particular state prescribed by the control information.

22. The method according to claim 21, which further comprises before putting the OCDS module into another state, checking whether the control information memory is storing valid control information.

23. The method according to claim 22, wherein the checking step is performed by determining whether a particular value is stored at a particular location within the control information memory.

24. The method according to claim 19, which further comprises:
providing the control information memory as the portion of the OCDS module that is supplied with power before supplying the other components of the program controlled unit with power; and
immediately putting the OCDS module into the particular State prescribed by the control information.

* * * * *